C. J. CARLSON & J. & E. LINDBERG.
SLED.
APPLICATION FILED MAY 18, 1914.
1,111,005.
Patented Sept. 22, 1914.
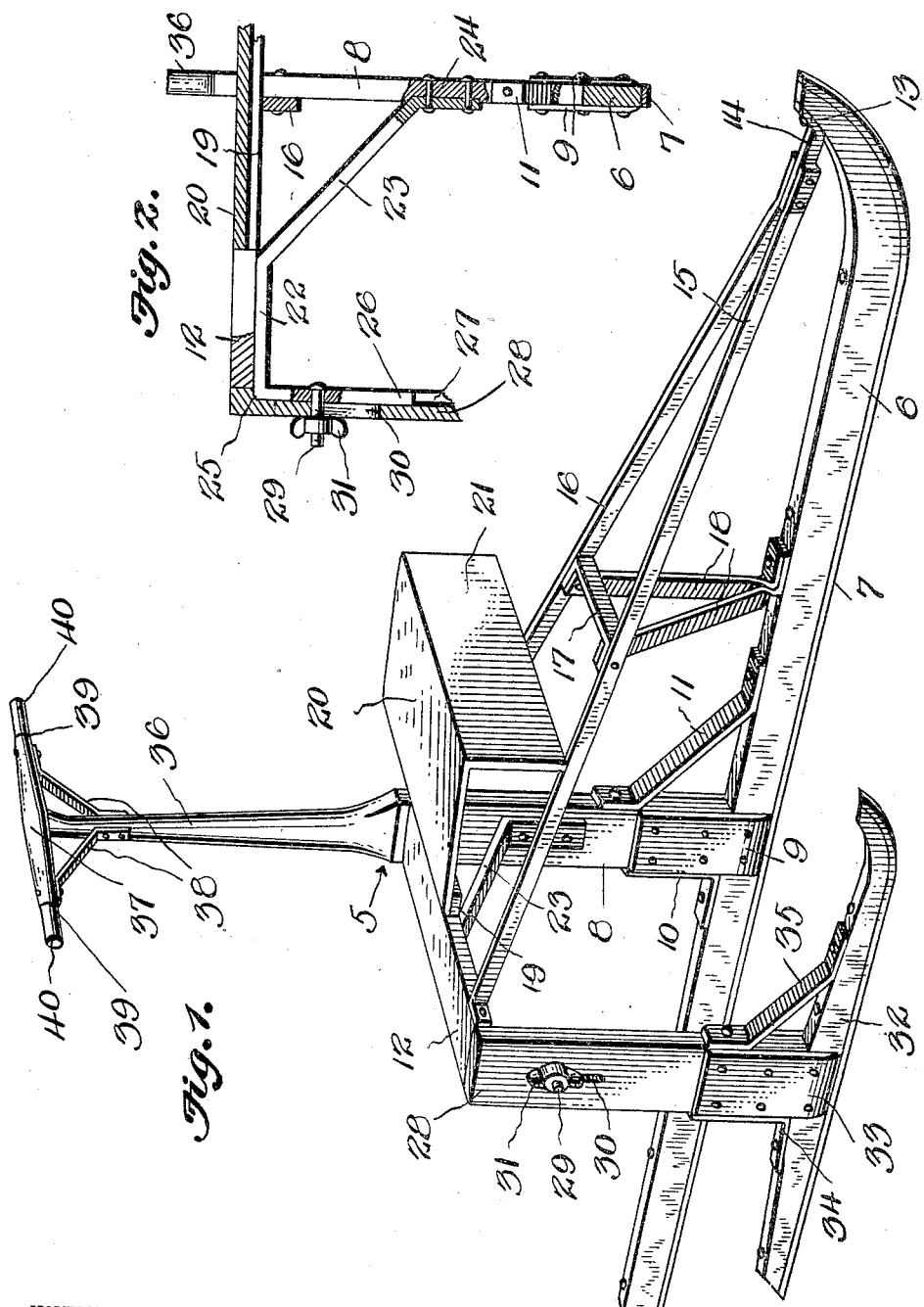
WITNESSES
A. C. Richardson
George W. Dorr
INVENTORS
C. J. Carlson, John and Eric Lindberg
Adrian Seger
Their Attorney

UNITED STATES PATENT OFFICE.

CARL J. CARLSON, OF CHICAGO, ILLINOIS, AND JOHN LINDBERG AND ERIC LINDBERG, OF KANE, PENNSYLVANIA.

SLED.

1,111,005.     Specification of Letters Patent.     Patented Sept. 22, 1914.

Application filed May 18, 1914. Serial No. 839,291.

*To all whom it may concern:*

Be it known that we, CARL J. CARLSON, JOHN LINDBERG, and ERIC LINDBERG, citizens of the United States, the first named, CARL J. CARLSON, residing at 5860 South State Street, Chicago, in the county of Cook and State of Illinois, and the said JOHN LINDBERG and ERIC LINDBERG, residing at Kane, in the county of McKean and State of Pennsylvania, have invented certain new and useful Improvements in a Sled, of which the following is a specification.

The principal object of this invention is the provision of a coasting sled of such design that the operator when seated thereon will have free use of his limbs for the purpose of propelling and guiding the same.

Another object of this invention is to construct a sled in such manner that one of the runners can be vertically adjusted with reference to the other runner, so as to adapt the same to the depth of the tracks in the road.

A further object of this invention is to improve and simplify sleds of this nature, rendering them comparatively simple and inexpensive to manufacture, reliable and efficient in use, and readily operated.

With the above and other objects in view, this invention resides in the novel features of construction, formations, combinations and arrangements of parts to be hereinafter more fully described, claimed, and illustrated in the accompanying drawing in which:

Figure 1 is a perspective view of our invention, and Fig. 2 is a transverse sectional view thereof.

Referring to the accompanying drawings by similar characters of reference, the numeral 5 designates in general our improved sled, which consists of a main stationary runner 6 reinforced at its lower edge by a metallic strip 7 and having connected to its intermediate portion and extending vertically therefrom, an upright 8, which is held rigid by the reinforcing plates 9 and the angle braces 10 and 11.

A cross bar 12 is connected at one end to the upright 8, while secured to the upwardly curved toe of the runner 6 is an attaching plate 13 formed with a rearwardly extending, upwardly inclined connecting tongue 14, to which are attached the foreward offsets of the rearwardly and upwardly diverging brace straps 15 and 16, the opposite ends of which are attached to the outer end of the cross bar 12, and the upright 8 respectively. These brace straps 15 and 16 are connected by a transverse strap 17, which in turn is connected at its terminals with the main runner 7, by the downwardly converging braces 18.

A supporting ledge 19 is secured to the forward edge of the cross bar 12 and extends a suitable distance beyond the outer edge of the upright 8. A seat 20 is secured to the supporting ledge 19 and is provided at its opposite edge with a depending brace flange 21 which rests upon the brace straps 15 and 16 and holds the seat in a normal or horizontal position.

The cross bar 12 has secured to its under side a brace 22 which slants downwardly as at 23 toward the upright 8 in which it is partially embedded and secured as at 24. The opposite end of bar 22, at the terminal of the cross bar 12 is depended as at 25 vertically, to produce a leg supporting extension 26 which is slidable within the groove 27 formed in the adjustable leg 28. A stud 29 projects from the extension 26 through a slot 30 in the leg 28. The stud 29 is threaded and has a winged nut 31 thereon by means of which the leg 28 can be locked in its various adjusted positions.

A supplemental adjustable runner 32 less in length than the main runner 6 is secured to the lower extremity of the adjustable leg 28 and is held rigid thereon by the reinforcing plates 33 and the braces 34 and 35, corresponding to the before described plates and braces 9, 10 and 11.

The upright 8 is reduced at its upper end and rounded as clearly shown in the drawing. To the upper end of this resultant post 36 is attached the cross handle 37 which is held against displacement by the braces 38. The opposite ends of the cross handle are cut as at 39 to produce hand grips 40, for the use of the operator.

From the foregoing disclosures taken in connection with the accompanying drawing, it will be manifest that a sled is provided which will fulfil all of the necessary requirements of such a device. It should be understood in this connection that various minor changes in the details of construction can be resorted to within the scope of the appended claims without departing from or sacrificing any of the advantages of the invention.

Having thus fully described this invention, what we claim as new and desire to protect by Letters Patent is:

1. A sled having a stationary and an adjustable runner, an upright secured to one runner, a cross bar secured to the upright, means carried by the cross bar for supporting the adjustable runner, the said means serving to brace the cross bar.

2. A sled comprising a pair of runners one being adjustable, an upright secured to one runner, a cross bar secured to the upright, braces for the cross bar, a seat carried by the cross bar, a supporting leg adjustable relative to the bar, a runner secured thereto, and means for locking the leg against movement.

3. The combination in a sled, with a cross bar, an upright secured thereto, a seat carried by the cross bar, a brace bar secured to the cross bar and upright, said brace bar being bent to produce a leg supporting member, a leg adjustable thereon, and runners secured to the upright and leg.

4. In a sled the combination with a cross bar, of an upright and a leg, runners carried by the upright and leg, means for placing the runners in different planes, a seat carried by the cross bar, the upright being extended above the seat, and a handle bar attached to the upright.

5. In a sled the combination with a cross bar, an upright secured thereto, a leg adjustable thereon, runners carried by the upright and leg, a ledge secured to the cross bar, a seat secured to the ledge, braces connecting the cross bar and upright with the runners, and a flange formed upon the seat and resting upon the braces.

6. The combination in a sled of a cross bar, an upright secured thereto, a brace bar secured to the cross bar and upright, a leg adjustable upon the brace bar, means for locking the leg against movement, runners attached to the upright and leg, a seat secured to the cross bar, a ledge supporting the seat, braces connecting one runner with the upright and cross bar, a flange formed upon the seat and resting upon the braces, and a handle-bar attached to the upright above the seat.

In testimony whereof, we have affixed our signatures in the presence of two witnesses.

CARL J. CARLSON.
JOHN LINDBERG.
ERIC LINDBERG.

Witnesses for Carlson:
  B. GREENBERG,
  GEO. H. HILLINGER.
Witnesses for John Lindberg and Eric Lindberg.
  F. J. WOODS,
  THOMAS M. PAISLEY.

---

Copies of this patent may be obtained for five cents each, by addressing the "Commissioner of Patents, Washington, D. C."